United States Patent
Hayashi et al.

(10) Patent No.: US 12,100,168 B2
(45) Date of Patent: Sep. 24, 2024

(54) TRAJECTORY CALCULATION DEVICE, TRAJECTORY CALCULATING METHOD, AND TRAJECTORY CALCULATING PROGRAM

(71) Applicant: Qoncept, Inc., Tokyo (JP)

(72) Inventors: Kenichi Hayashi, Tokyo (JP); Shunsuke Nambu, Tokyo (JP)

(73) Assignee: QONCEPT, INC., Tokyo (JP)

( * ) Notice: Subject to any disclaimer, the term of this patent is extended or adjusted under 35 U.S.C. 154(b) by 393 days.

(21) Appl. No.: 17/525,713

(22) Filed: Nov. 12, 2021

(65) Prior Publication Data
US 2022/0156947 A1    May 19, 2022

(30) Foreign Application Priority Data
Nov. 19, 2020    (JP) .................................. 2020-192118

(51) Int. Cl.
G06T 7/246 (2017.01)
G06T 7/73 (2017.01)

(52) U.S. Cl.
CPC ................ G06T 7/248 (2017.01); G06T 7/74 (2017.01); *G06T 2207/30241* (2013.01)

(58) Field of Classification Search
CPC .. G06T 2207/30241; G06T 7/248; G06T 7/74
See application file for complete search history.

(56) References Cited

U.S. PATENT DOCUMENTS

| 6,782,118 B2 * | 8/2004 | Verga ..................... G01C 11/02 473/468 |
| 2001/0048754 A1 | 12/2001 | Antonio |

(Continued)

FOREIGN PATENT DOCUMENTS

| JP | 09322052 A | 12/1997 |
| JP | 2001336917 A | 12/2001 |

(Continued)

OTHER PUBLICATIONS

The Cao Je, et al., "Realtime Multi-Person 2D Pose Estimation using Part Affinity Fields," arXiv: 161 I.08050v2 [cs.CV] Apr. 14, 2017.

(Continued)

*Primary Examiner* — Pinalben Patel
(74) *Attorney, Agent, or Firm* — Trojan Law Offices

(57) ABSTRACT

In the athletic competition involving jumping such as figure skating, it is desired to measure jumping height and flight distance by calculating a trajectory of a moving object as a target from moving images captured by a monocular camera. Provided is a device, a method and a program to calculate the trajectory of the moving object jumping in three dimensions from information of a plurality of image frames captured by the monocular camera by detecting a specific point of the moving object, calculating an amount of change with respect to three-dimensional positions of the specific point in the consecutive image frames, and calculating the trajectory of the specific point from a positional relation between straight lines having the positions of the specific point and a curved line capable of expressing a parabolic motion passing through a take-off point and a landing point.

17 Claims, 5 Drawing Sheets

(56) References Cited

U.S. PATENT DOCUMENTS

| | | | | |
|---|---|---|---|---|
| 2008/0312010 A1* | 12/2008 | Marty | ...................... | G06T 7/70 |
| | | | | 73/865.4 |
| 2012/0002041 A1* | 1/2012 | Nejah | ................ | A63B 24/0021 |
| | | | | 348/E5.09 |
| 2017/0083748 A1* | 3/2017 | Zhou | ...................... | G06V 10/44 |
| 2021/0133983 A1 | 5/2021 | Hayashi et al. | | |
| 2022/0122269 A1* | 4/2022 | Marty | .................... | H04N 23/80 |
| 2022/0366577 A1 | 11/2022 | Nagai | | |

FOREIGN PATENT DOCUMENTS

| | | | |
|---|---|---|---|
| JP | 2005235104 A | | 9/2005 |
| JP | 2012-154806 A | | 8/2012 |
| JP | 2012154805 A | | 8/2012 |
| JP | 5635426 B | | 10/2014 |
| JP | 6697150 B | | 4/2020 |
| JP | 6763559 B | | 4/2020 |
| KR | 20180050589 A | * | 5/2018 |
| WO | 20211085678 A1 | | 9/2020 |

OTHER PUBLICATIONS

Korean Intellectual Property Office, Notice of Opinion Submission for Application No. 10-2021-0140519 (2023).

* cited by examiner

TRAJECTORY CALCULATION DEVICE, TRAJECTORY CALCULATING METHOD, AND TRAJECTORY CALCULATING PROGRAM

CROSS REFERENCE TO RELATED APPLICATIONS

This application is based upon and claims the benefits of priorities from Japanese Patent Application No. 2020-192118 filed on Nov. 19, 2020 being matured to be Japanese patent No. 6858387 registered on Mar. 26, 2021, the entire contents of which are incorporated herein by reference.

TECHNICAL FIELD

The present disclosure relates to a trajectory calculation device, a trajectory calculation method, or a trajectory calculation program.

BACKGROUND ART

In athletic competitions involving jumping such as figure skating, there is a need to measure the height and flight distance of jumping by calculating the trajectory of a moving object from the captured moving image.

In an athletic competition in the track or field, a technology to calculate a position of a moving object in three-dimensional space is known based on image data captured by a camera installed at a position in the stadium suitable for measuring jumping height and flight distance. For example, there are techniques described in Patent Reference 1 and so on.

It is also generally conducted to calculate the trajectory of a moving object by obtaining the continuous three-dimensional position of the moving object from the stereo image data captured by a plurality of cameras in synchronization. For example, there are techniques described in Patent Reference 2 and so on.

Here, Non-Patent Reference 1 discloses a technology about a human pose estimation in two dimensions from image data. Non-Patent Reference 1 will be referred to in an embodiment for carrying out the invention.

PRIOR ART REFERENCES

Patent References

[Patent Reference 1] JP 2001-336917, A
[Patent Reference 2] JP 2005-235104, A

Non-Patent References

[Non Patent Reference 1] Zhe Cao Je, et al., 'Realtime Multi-Person 2D Pose Estimation using Part Affinity Fields' arXiv:1611.08050v2 [cs.CV] 14 Apr. 2017.

PRIOR ART REFERENCES

Summary of the Invention

A method to remotely flash an external module generally comprises the steps to electronically transfer a computer program, such as a firmware or a software, from a computer device to an external module, to install the external module to a vehicle, to collect the key data from a device securing the vehicle using a computer program, to transfer the key data to a computer, to analyze and process the key data with a computer program, collect key data from a transponder paired to the device securing the vehicle using a computer program, to transfer the key data to a computer, to analyze and process the key data to generate a securing device bypass allowing the external module to communicate with the securing device and to transfer the generated securing device bypass to the external module.

Problem to be Solved by the Invention

However, the technology described in Patent Reference 1 and the like cannot be used in athletic competitions such as figure skating where a camera cannot be installed in a skating rink. And, in the stereo matching as described in Patent Reference 2, it is necessary for multiple cameras to take images in synchronization, but if a trajectory of a moving object can be calculated with high accuracy from moving images captured by a monocular camera, imaging equipment for measuring jumping height and flight distance can be simplified.

Therefore, in an embodiment of the present invention, it is an object to provide a device that calculates a trajectory of a moving object with high accuracy from moving images captured by a monocular camera in athletic competitions including jumping such as figure skating, a method of calculating the same, and a program performing the same.

Means to Solve the Problem

In an embodiment of the present invention, a trajectory calculation device capable of calculating a trajectory of a moving object as a target jumping in three dimensions from information of a plurality of image frames captured by a monocular camera is characterized by comprising: a detection unit that detects a specific point of the moving object as the target from the information of the plurality of image frames; an existence straight line calculation unit that calculates an existence straight line connecting a three-dimensional position with respect to each of images of the specific point captured in the plurality of image frames and a three-dimensional position of an optical center of a lens of the monocular camera; a take-off point calculation unit that calculates a three-dimensional position of the specific point at a take-off point by calculating an amount of change related to a three-dimensional position of the specific point from the information of the plurality of image frames that are consecutive and determining the take-off point where the moving object as the target takes off from the calculated amount of change; a landing point calculation unit that calculates a three-dimensional position of the specific point at a landing point by calculating an amount of change related to a three-dimensional position of the specific point from information of the plurality of image frames that are consecutive and determining the landing point where the moving object as the target lands from the calculated amount of change; and a trajectory calculation unit that calculates the trajectory of the specific point in three dimensions from a positional relation of a curved line capable of expressing a parabolic motion passing through the three-dimensional position of the specific point at the landing point being calculated by the landing point calculation unit and the three-dimensional position of the specific point at the landing point being calculated by the landing point calculation unit and the existence straight line with respect to images of the specific point captured in the plurality of image frames after take-off of the moving object as the target and before landing of the moving object as the target.

Here, the specific point of the moving object as the target refers to a point being specified in order to calculate the trajectory of the moving object as the target from the information of the image frames. For example, in a figure skating competition described as an embodiment of the present invention to be described later, a tip of a blade of a skate boot worn by a skater is set as a specific point. With respect to the specific point, the same applies in the disclosure of the present application.

Further, in the disclosure of the present application, as described above, a straight line connecting the three-dimensional position of an image of the specific point captured in the image frame and the three-dimensional position of the optical center of the lens of the monocular camera is referred to as an existence straight line.

Here, the image frames that are consecutive signify a state where no image frames exist between two image frames, but it is not necessary for the image frame numbers to be consecutive. For example, even if two image frames are consecutively arranged, the frame number of each frame may not be consecutive since another image frame originally having existed between the two image frames may be removed in a frame removal process. Further, in the case of a plurality of consecutive image frames, it is assumed that the plurality of image frames are consecutive in the chronological order of time along the same flow of time. Therefore, in an embodiment of the present invention, the information of the image frame includes the time when the image frame was captured as the information in addition to the captured image information. All the above will apply in the disclosure of the present application.

In a trajectory calculation device as an embodiment of the present invention, a take-off point calculation unit is characterized by including means for calculating a three-dimensional position of the specific point at the take-off point by calculating an amount of change related to the three-dimensional position of the specific point from information of a plurality of image frames that are consecutive in a chronological order of time when capturing the image frames and determining the take-off point as the moving object as the target takes off in the case where the calculated amount of change is larger than a predetermined threshold value.

In a trajectory calculation device as an embodiment of the present invention, a landing point calculation unit is characterized by including means for calculating a three-dimensional position of the specific point at the landing point by calculating an amount of change related to the three-dimensional position of the specific point from information of a plurality of image frames that are consecutive in a reverse chronological order of time when capturing the image frames and determining the landing point as the moving object as the target lands in the case where the calculated amount of change is larger than a predetermined threshold value.

In an embodiment of the present invention, a trajectory calculation device includes a landing point calculation unit including means for calculating a three-dimensional position of the specific point at the landing point by calculating an amount of change related to the three-dimensional position of the specific point from information of a plurality of image frames that are consecutive in a chronological order of captured times after capturing the landing point; acquiring time of capturing the moving object as the target at an apex of jumping by determining the moving object reaches the apex of the jumping when the calculated amount turns from positive to negative or from negative to positive; calculating an amount of change related to a three-dimensional position of the specific point from information of the plurality of image frames that are consecutive in a reverse chronological order of captured times starting from time when a period of time obtained by doubling a period of time from when capturing the take-off point to when capturing the moving object at the apex and by further adding a constant period of time to the thus-doubled period of time passes by from when capturing the take-off point; and determining the landing point as the moving object as the target lands when the calculated amount of change is larger than a predetermined threshold value.

In an embodiment of the present invention, a trajectory calculation device includes a trajectory calculation unit including: means for calculating a curved line as the trajectory of the specific point in the three dimensions wherein the curved line is capable of expressing a parabolic motion passing through a three-dimensional position of the specific point at the take-off point calculated by the take-off point calculation unit and a three-dimensional position of the specific position at the landing point calculated by the landing point calculation unit and wherein the curved line minimizes a sum of distances from respective existence straight lines for images of the specific point captured in the plurality of image frames after take-off of the moving object as the target and before landing of the moving object as the target.

In an embodiment of the present invention, a trajectory calculation device includes a trajectory calculation unit including: means for calculating a curved line as the trajectory of the specific point in the three dimensions wherein the curved line is capable of expressing a parabolic motion passing through a three-dimensional position of the specific point at the take-off point calculated by the take-off point calculation unit and a three-dimensional position of the specific position at the landing point calculated by the landing point calculation unit and wherein, with respect to one or more images of the specific point after take-off of the moving object as the target and before landing of the moving object as the target, the curved line minimizes a sum of distances between one or more predicted positions on the cured line at the time when images of the specific point are captured, respectively, and one or more existence straight lines for one or more images of the specific point captured in the image frames at the time when the images of the specific point are captured, respectively.

In an embodiment of the present invention, a trajectory calculation method of calculating a trajectory of a moving object as a target jumping in three dimensions from information of a plurality of image frames captured by a monocular camera is characterized by including the steps of: detecting a specific point of the moving object as the target from information of the plurality of image frames; calculating an existence straight line connecting a three-dimensional position with respect to each of images of the specific point captured in the image frames and a three-dimensional position of an optical center of a lens of the monocular camera; calculating a three-dimensional position of the specific point at a take-off point by calculating an amount of change related to a three-dimensional position of the specific point from information of the plurality of image frames that are consecutive and determining the take-off point where the moving object as the target takes off from the calculated amount of change; calculating a three-dimensional position of the specific point at a landing point by calculating an amount of change related to a three-dimensional position of the specific point from information of the plurality of image frames that are consecutive and determining the landing point where the moving object as the target lands from the calculated amount of change; and calculating the trajectory of the specific point in three dimensions from a positional relation of a curved line capable of expressing a parabolic motion passing through the three-dimensional position of the specific point at the take-off point having been calculated and the three-dimensional position of the specific point at the landing point having been calculated and the existence straight lines with respect to images of the specific point captured in the plurality of image frames after take-off of the moving object as the target and before landing of the moving object as the target.

In an embodiment of the present invention, a trajectory calculation program to calculate a trajectory of a moving object as a target jumping in three dimensions from information of a plurality of image frames captured by a monocular camera is characterized by causing a computer to execute the steps of: detecting a specific point of the moving object as the target from information of the plurality of image frames; calculating an existence straight line connecting a three-dimensional position with respect to each of images of the specific point captured in the image frames and a three-dimensional position of an optical center of a lens of the monocular camera; calculating a three-dimensional position of the specific point at a take-off point by calculating an amount of change related to a three-dimensional position of the specific point from information of the plurality of image frames that are consecutive and determining the take-off point where the moving object as the target takes off from the calculated amount of change; calculating a three-dimensional position of the specific point at a landing point by calculating an amount of change related to a three-dimensional position of the specific point from information of the plurality of image frames that are consecutive and determining the landing point where the moving object as the target lands from the calculated amount of change; and calculating the trajectory of the specific point in three dimensions from a positional relation of a curved line capable of expressing a parabolic motion passing through the three-dimensional position of the specific point at the take-off point having been calculated and the three-dimensional position of the specific point at the landing point having been calculated and the existence straight lines with respect to images of the specific point captured in the plurality of image frames after take-off of the moving object as the target and before landing of the moving object as the target.

According to an embodiment of the present invention, in an athletic competition involving jumping such as figure skating, the trajectory of a moving object can be calculated with high accuracy from moving images captured by a monocular camera.

EMBODIMENT FOR CARRYING OUT THE INVENTION

Figure 1:
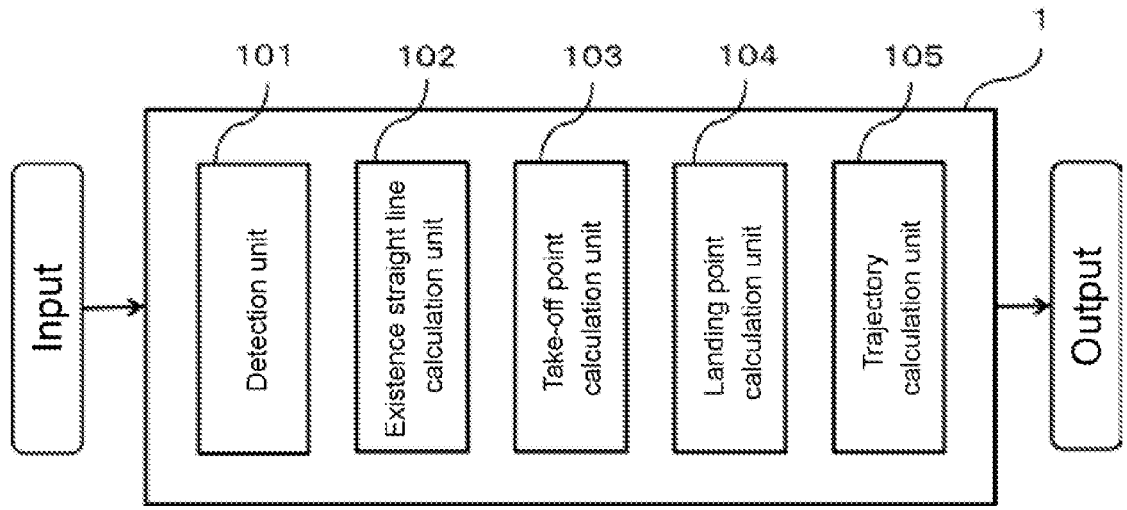
FIG. 1 shows a block diagram of a trajectory calculation device.

A description will be given for explaining an embodiment of the present invention with reference to the drawings. The overlapping description may be omitted, and like reference numerals designate identical or equivalent elements in the respective drawings.

The trajectory calculation device, method, and program according to the present embodiment can accurately calculate a trajectory of a moving object from a moving image captured by a monocular camera, for example, in an athletic competition involving jumping such as figure skating.

FIG. 1 shows a block diagram of a trajectory calculation device. The trajectory calculation device 1 may not only be configured as a stand-alone device, but also be incorporated into another device for use. The other device that incorporates the trajectory calculation device 1 may be an electric appliance such as a smartphone, an information mobile terminal, a digital camera, a game terminal, a television, etc. The trajectory calculation device 1 is configured to be a computer including physically a central processing unit (CPU) 201, an input device 202, an output device 203, a main memory (RAM/ROM) 204, and an auxiliary memory 205 as shown in FIG. 2.

Figure 2:
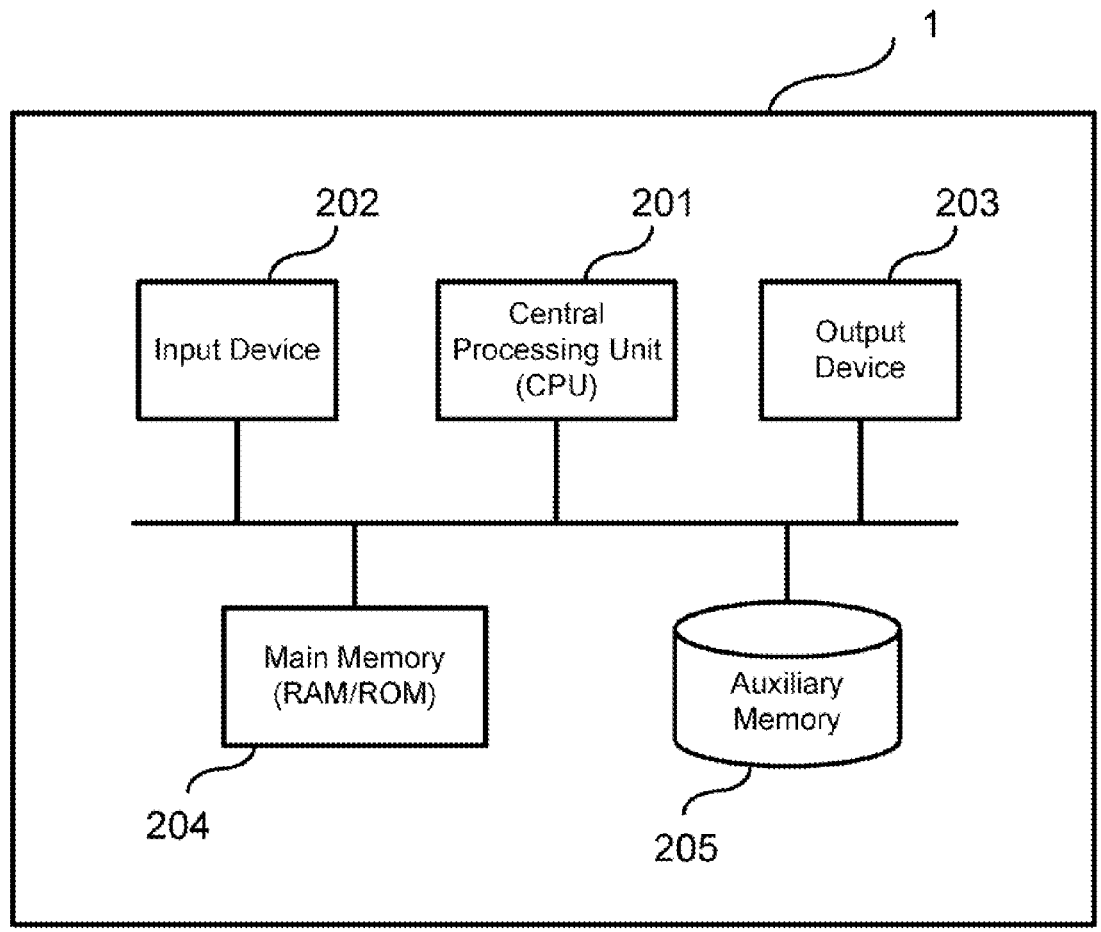
FIG. 2 shows a hardware configuration diagram of the trajectory calculation device

Each function of the trajectory calculation device 1 may be performed by making the input device 202 and the output device 203 operate under the control of the central computing device (CPU) 201 such that data is read from and/or written on the main memory (RAM/ROM) 204 and the auxiliary memory 205 as a program making the computer operate is loaded beforehand on the central computing device (CPU) 201, the main memory (RAM/ROM) 204, and so on as shown in FIG. 2 such that a change of the position of the specific point of the moving object as the target is tracked from the moving image captured by the monocular camera and a trajectory of the three-dimensional position is calculated without losing the specific point even if the specific point of the moving object as the target is temporarily shielded.

As shown in FIG. 1, the trajectory calculation device 1 includes a detection unit 101, an existence straight line calculation unit 102, a take-off point calculation unit 103, a landing point calculation unit 104, and a trajectory calculation unit 105. The trajectory calculation device 1 is provided with information of an image frame about the moving image of the moving object as the target captured by the monocular camera as an input from the outside. The information of the image frame includes, in addition to the information of a captured image, the time when the image frame was captured as information. Further, the trajectory calculation device 1 outputs information about a trajectory of a specific point of the moving object as the target to the outside.

According to the block diagram of FIG. 1, each function of each block of the trajectory calculation device 1 is explained. Here, a detailed operation of each block will be explained in an embodiment to be described later.

The detection unit 101 detects a specific point of the moving object as the target from the information of the image frame.

The existence straight line calculation unit 102 calculates an existence straight line connecting a three-dimensional position of the image of the specific point captured in the image frame and a three-dimensional position of an optical center of a lens of the monocular camera. A specific calculation process will be referred to in an embodiment to be described later.

The take-off point calculation unit 103 calculates an amount of change of a three-dimensional position of the specific point from the information of a plurality of consecutive image frames, determines a take-off point where the moving object as the target took off from the thus-calculated amount of change, and calculates a three-dimensional position of the specific point at the take-off point. The specific calculation process will be referred to in an embodiment to be described later.

The landing point calculation unit 104 calculates the amount of change of a three-dimensional position of the specific point from the information of a plurality of consecutive image frames, determines a landing point where the moving object as the target landed from the thus-calculated amount of change, and calculates a three-dimensional position of the specific point at the landing point. A specific calculation process will be referred to in an embodiment to be described later.

The trajectory calculation unit 105 calculates a trajectory of the specific point in the three-dimensions from the positional relation between a curved line capable of describing a parabolic motion passing through a three-dimensional position of the specific point at the take-off point calculated by the take-off point calculation unit and a three-dimensional position of the specific point at the landing point calculated by the landing point calculation unit, and one or more existence straight lines for one or more images of the specific point captured in one or more image frames after take-off of the moving object as the target and before landing of the moving object as the target. A specific calculation process will be referred to in an embodiment to be described later.

Next, an operation of the trajectory calculation device 1 will be explained according to this embodiment. In consideration of the ease of understanding the explanation, the operation of the trajectory calculation device 1 is explained as an embodiment in the case where a trajectory of a tip of a blade of a figure skate boot worn by a skater who jumped is calculated from images of a figure skating competition captured by a monocular camera. Here, it should be noted that this is an example, and the application of the present invention is not limited to the figure skating competition.

EMBODIMENT

Figure 3:
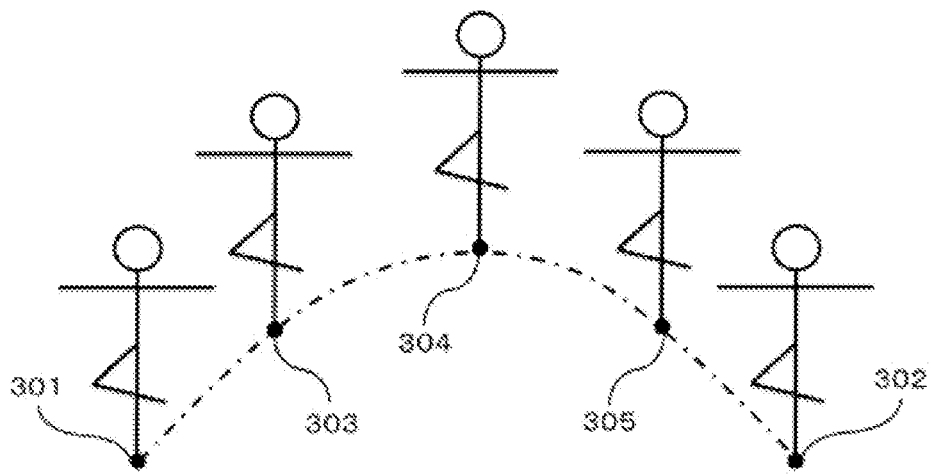
FIG. 3 shows a diagram depicting schematically that a skater jumps in a figure skating competition.

FIG. 3 shows a diagram schematically depicting that a skater jumps in a figure skating competition described as a preferred example in this embodiment. In FIG. 3, each of 301 to 305 shows the tip of the blade of the skate boot worn by the skater who jumps, and the tip of the blade of the skate boot is set as the specific point in this embodiment. The image of the specific point at the take-off point is indicated by 301, the image of the specific point at the landing point is indicated by 302, and the images of the specific point in the air in the middle of jumping are indicated by 303 to 305, respectively. In particular, 304 indicates the image of the specific point at the apex in the trajectory of the jumping.

In the figure skating competition, the height and flight distance of the jumping are major determining factors in judging which performance is better such that there is a big demand to obtain the trajectory of the skater's jump from the images captured in the figure skating competition. On the other hand, in recent years, it has become more common to capture moving images with a monocular camera with ease as a camera built into a device such as a so-called smartphone that is also improved to have high performance. If the trajectory of the moving object can be calculated with high accuracy from the moving images captured by the monocular camera in an athletic competition involving jumping such as figure skating, the demand wishing to measure the height and flight distance of the jumping with simple equipment such as a smartphone can be met. Therefore, in an embodiment of the present invention, it is suitably adopted in the figure skating competition. This is an example, and the application of the present invention is not limited to the figure skating competition.

Figure 4:
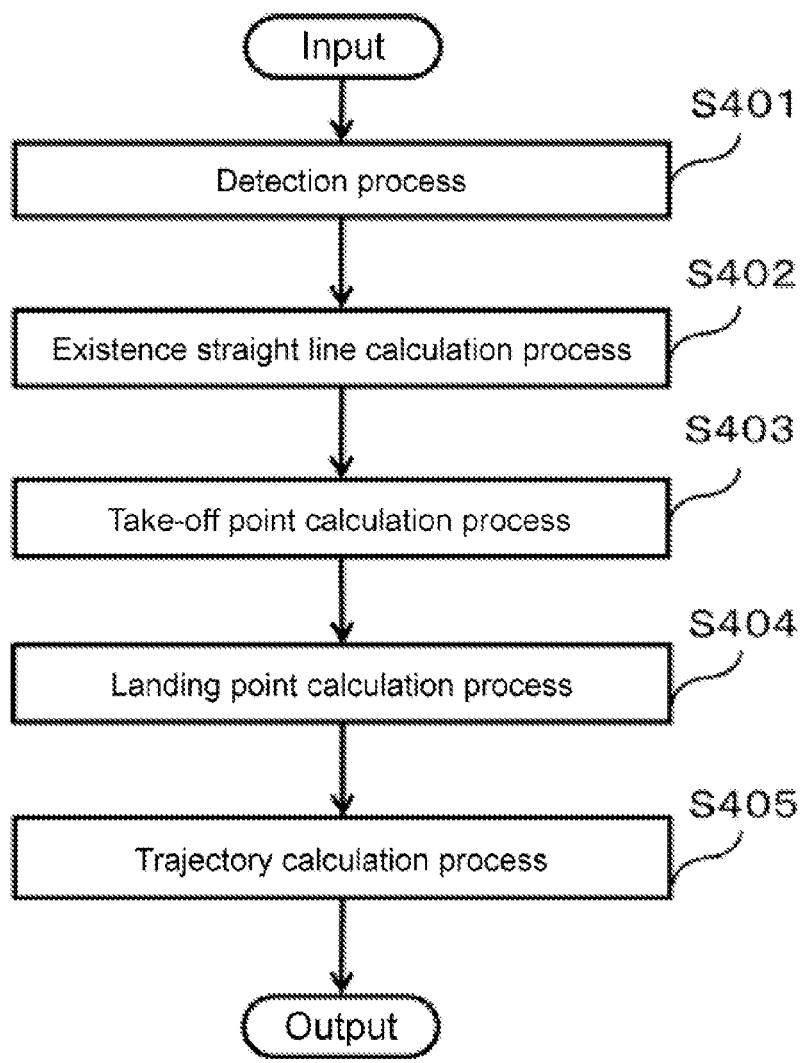
FIG. 4 shows a flow chart illustrating an operation of a trajectory calculation device in an embodiment.

FIG. 4 shows a flowchart illustrating the operation of the trajectory calculation device 1 according to this embodiment. The operation of the trajectory calculation device 1 in this embodiment is described with reference to the flowchart of FIG. 4.

Information of a plurality of image frames captured by the monocular camera is input into the trajectory calculation device 1. In this embodiment, the information of the image frames includes the time when the image frames were captured as information in addition to the captured image information. The trajectory calculation device 1 starts the operation after all information of the image frames to be processed is input. The start of the operation may be performed automatically after the information of the image frames is input, or it may be triggered by an explicit instruction. The trajectory calculation device 1 performs processes of the flowchart of FIG. 4 with respect to the input information of the image frames.

When the trajectory calculation device 1 starts the operation, the detection unit 101 executes the detection process (S401). In the detection process (S401), the specific point of the moving object as the target having been captured is detected from the input image data. In this embodiment, as mentioned above, a point of the tip of the blade of skate boot worn by the skater is taken as the specific point.

With respect to the detection of the specific point from the image data, any method may be used as long as the coordinates of the specific point in the image frame in the two-dimensional plane can be detected from the image data. For example, it may be based on a two-dimensional human pose estimation technique and the like from image data disclosed in Non-Patent Reference 1 and the like. Further, a method of detecting a marker from the image data, the marker having been attached to a specific point in advance by the skater to be captured, may be used. When the detection process (S401) is completed by the detection unit 101, the existence straight line calculation unit 102 starts the existence straight line calculation process (S402).

Figure 5:
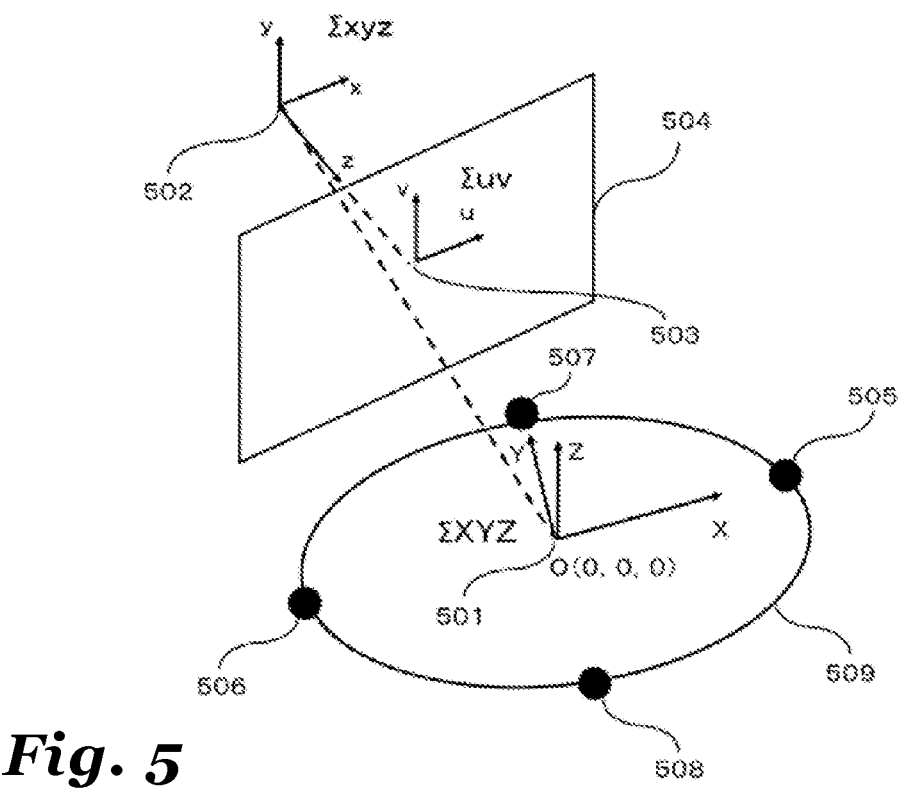
FIG. 5 shows a diagram depicting a coordinate system used in an explanation in an embodiment.

Here, prior to the explanation of the existence straight line calculation process (S402) performed by the existence straight line calculation unit 102, while temporarily departing from the flowchart of FIG. 4, the coordinate system used in the explanation of this embodiment will be described. FIG. 5 shows a diagram illustrating the coordinate system used in the explanation of this embodiment.

The coordinate system ΣXYZ is a three-dimensional Cartesian coordinate system in a real three-dimensional space. In this embodiment, the coordinate system ΣXYZ is to be a three-dimensional Cartesian coordinate system where the X axis is taken in the major axis direction and the Y axis is taken in the minor axis direction by assuming a shape of an ice surface 509 of the ice skating rink where the figure skating competition is performed is elliptical and symmetrical in the major axis direction and in the minor axis direction, respectively, and the intersection of the major axis and the minor axis is set as the origin O (0,0,0) 501.

Further, in this embodiment, as known plural points (hereinafter referred to as reference points) whose three-dimensional coordinates are known in the coordinate system ΣXYZ, two intersections (505 and 506) of the peripheral edge of the ice surface 509 and the X axis and two intersections (507 and 508) of the peripheral edge of the ice surface 509 and the Y axis are set to have the following three-dimensional coordinates, respectively. Here, the length of the rink along the major axis direction is 2A, and the length of the rink in the minor axis direction is 2B. A and B are constants.

Reference point 505: (X, Y, Z)=(A, 0, 0)
Reference point 506: (X, Y, Z)=(−A, 0,0)
Reference point 507: (X, Y, Z)=(0, B, 0)
Reference point 508: (X, Y, Z)=(0, −B, 0)

It should be noted that this is merely an example, and the setting of the three-dimensional coordinate system and the reference points is not limited to this. It is preferable to have a appropriate setting of the three-dimensional coordinate system and the reference points according to the motion characteristics and environmental conditions of the moving object as the target. In this embodiment, as will be described later, the reference point whose three-dimensional position coordinates are known is utilized in order to obtain the three-dimensional position coordinates of the optical center of the camera lens and the extrinsic parameters of the lens.

The coordinate system Σxyz is the three-dimensional Cartesian coordinate system having the origin 502 at the optical center of a lens of a camera. The coordinate system Σuv is the two-dimensional Cartesian coordinate system having the origin 503 fixed on the image frame (image sensor plane) 504. The coordinate system Σuv is a coordinate system in which the coordinate system Σxyz is translated and the xy coordinate axis and the uv coordinate axis are parallel. Further, the intersection of the z-axis of the coordinate system Σxyz and the image frame 504 is the origin 503 of the coordinate system Σuv. The z-axis of the coordinate system Σxyz is orthogonal to the image frame 504.

The above is an explanation of the coordinate systems used in the explanation of this embodiment.

Figure 6:
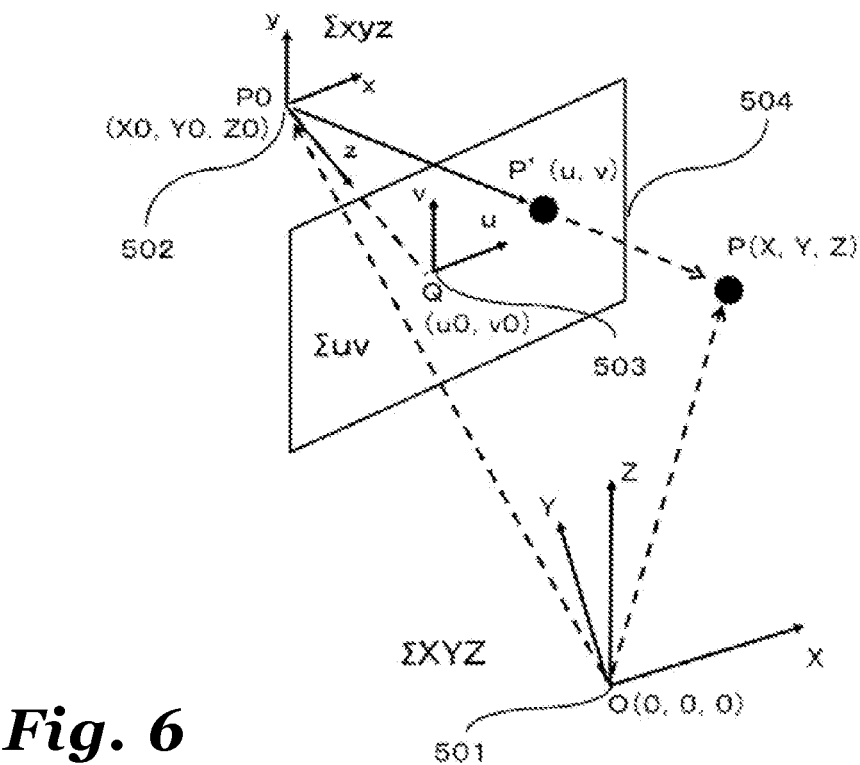
FIG. 6 shows a diagram illustrating how an image of a specific point as a target is taken in a three-dimensional space in the coordinate system of FIG. 5.

Returning to FIG. 4, it proceeds back to the explanation of the existence straight line calculation process performed by the existence straight line calculation unit 102. With reference to FIG. 6, the calculation of the three-dimensional straight line that is configured by connecting the three-dimensional position of the image of the specific point as the target in the image frame and the optical center of the lens of the camera will be described, the calculation being performed in the existence straight line calculation process (S402).

FIG. 6 shows a diagram illustrating a state that a specific point P, which is a target in the three-dimensional space, is captured by a camera in the coordinate system of FIG. 5. Let P(X, Y, Z) be the three-dimensional position of the specific point P as the target in the three-dimensional Cartesian coordinate system ΣXYZ. The specific point P as the target is captured and imaged as an image P' on the image frame 504 by the camera having the optical center of the lens at the origin 502 of the three-dimensional Cartesian coordinate system Σxyz. Let P'(u, v) be the two-dimensional position of the image P' in the two-dimensional Cartesian coordinate system Σuv in the image frame 504.

In FIG. 6, the position of the optical center of the lens (origin 502 of the three-dimensional Cartesian coordinate system Σxyz) in the three-dimensional Cartesian coordinate system ΣXYZ is defined as P0(X0, Y0, Z0). The z-axis of the three-dimensional Cartesian coordinate system Σxyz having the optical center of the lens at the origin 502 corresponds to the optical axis. The optical axis is orthogonal to the image frame 504 and the intersection of the optical axis and the image frame 504 would be the origin 503 in the two-dimensional Cartesian coordinate system Σuv in the image frame. The two-dimensional position of the origin 503 is set as Q(u0, v0). The distance between the origin 502 in the three-dimensional Cartesian coordinate system Σxyz and the origin 503 in the two-dimensional coordinate system Σuv is the focal length and the length thereof may be represented by d.

In FIG. 6, the position of the image P' as viewed from the three-dimensional Cartesian coordinate system Σxyz having the optical center of the lens at the origin 502 is P'(u−u0, v−v0, d). Here, let k be a proportionality constant and let R be a coordinate transformation matrix from the three-dimensional Cartesian coordinate system Σxyz having the optical center of the lens at the origin 502 to the three-dimensional Cartesian coordinate system ΣXYZ in the three-dimensional space. In this embodiment, the coordinate transformation matrix R can be determined if the position coordinates and the rotation of the camera in the three-dimensional Cartesian coordinate system ΣXYZ in the three-dimensional space are given.

The rotation is one of so-called extrinsic parameters of the lens, and is a rotation angle parameter of three axes when the coordinates are converted from the coordinate system Σxyz to the coordinate system ΣXYZ in FIG. 6. The optical axis of the lens is fixed by determining the value of the rotation. In FIG. 6, the z-axis of the coordinate system Σxyz is the optical axis.

And, in an embodiment, it is assumed that so-called intrinsic parameters (focal length and lens distortion) are known. In FIG. 6, the distance between the optical center point of the lens (origin 502 of the coordinate system Σxyz) of the camera and the origin 503 of the coordinate system Σuv is the focal length. If the distortion of the lens affects the result, an image from which the distortion is removed is generated, and the subsequent processing is performed with respect to the image from which the distortion has been removed. In order to remove the distortion, a function for distortion correction disclosed publicly in OpenCV can be used.

In the three-dimensional Cartesian coordinate system Σxyz having the optical center of the lens as the origin 502, the optical center (origin 502) of the lens, the image P' and the specific point P as the target are on the same straight line such that the following equation (Formula 1)) may be made (work).

$$P(X,Y,Z)=P0(X0,Y0,Z0)+k\ R\ P'(u-u0,v-v0,d) \quad \text{(Formula 1)}$$

In this embodiment, the X element and Y element of P': u−u0 and v−v0, can be obtained from the coordinates of the two-dimensional position passed by the detection unit 101 to the existence straight line calculation unit 102, and d is the focal length and known.

The previous equation (Formula 1) is an equation of a straight line (linear equation) in the three-dimensional Cartesian coordinate system ΣXYZ connecting the optical center of the lens, the image P', and the specific point P as the target. If the two-dimensional coordinates of the image P' of the image frame 504 in the two-dimensional Cartesian coordinate system Σuv can be determined when the specific point P is captured and imaged by the camera having the optical center of the lens at the origin 502 of the three-dimensional Cartesian coordinate system Σxyz, the previous equation (Formula 1) can be calculated, and the specific point P as the target exists on the straight line represented by the previous equation (Formula 1) in the three-dimensional Cartesian coordinate system ΣXYZ.

If the three-dimensional position coordinates and the rotation of the optical center of the lens of the camera are not given in advance, the three-dimensional position coordinates of the optical center of the lens of the camera and the extrinsic parameter of the lens are obtained by utilizing the reference point whose three-dimensional position coordinates are known, and the coordinate transformation matrix R is determined. As described above, in this embodiment, the three-dimensional coordinates in the three-dimensional Cartesian coordinate system ΣXYZ are known for the four reference points 505, 506, 507, and 508 as shown below, and the two-dimensional coordinates of an image of each reference point in the two-dimensional Cartesian coordinate system Σuv can also be measured.

Reference point 505: (X, Y, Z)=(A, 0, 0)
Reference point 506: (X, Y, Z)=(−A, 0,0)
Reference point 507: (X, Y, Z)=(0, B, 0)
Reference point 508: (X, Y, Z)=(0, −B, 0)

As described above, using FIG. 6, in the three-dimensional Cartesian coordinate system Σxyz having the optical center of the lens as the origin 502, the optical center (origin 502) of the lens, the image P', and the specific point P as the target are on the same straight line such that the linear equation (Formula 1) in the three-dimensional Cartesian coordinate system ΣXYZ connecting the optical center of the lens in the three-dimensional Cartesian coordinate system Σxyz, the image P', and the specific point P as the target is obtained. In the linear equation (Formula 1), let P(X, Y, Z) be a reference point and let P'(u, v) be an image in the image frame corresponding to the reference point, then d is known such that the rotation constituting the coordinate transformation matrix R and the optical center P0(X0, Y0, Z0) of the lens of the camera in the three-dimensional Cartesian coordinate system ΣXYZ may be calculated.

With respect to calculation of the rotation (rotation angle parameters of the three axes in the coordinate transformation from the coordinate system Σxyz to the coordinate system ΣXYZ) constituting the coordinate transformation matrix R and the optical center P0(X0, Y0, Z0) of the lens of the camera in the three-dimensional Cartesian coordinate system ΣXYZ, the number of unknown elements is six (6) and the image of the moving object as the target in the image frame is given by elements of the two-dimensional Cartesian coordinate system Σuv such that it may be sufficient that the number of the reference points is three (3). However, in consideration of improvement in the calculation accuracy by increasing the number of reference points, in this embodiment, the number of reference points is set to be four (4). It is preferable that the number of the reference points should be suitable for the arrangement of the available reference points and the space to be measured such that the number of the reference points is not limited to four (4).

In this embodiment, the position coordinates and rotation in the three-dimensional coordinate system of the camera are calculated by the nonlinear least squares method. Here, this is an example, while the processing method is not limited to this, other processing methods may be employed as long as the position coordinates and rotation in the three-dimensional coordinate system of the camera can be calculated with high accuracy. For example, the calculation by the LM method (Levenberg-Marquardt Method) where high accuracy can be expected and the calculation by the DLT method (Direct Linear Transformation method) where the number of reference points is increased and the like may be considered.

Thus, the explanation of the existence straight line calculation process (S402) by the existence straight line calculation unit 102 has been made in the above. When the existence straight line calculation process (S402) by the existence straight line calculation unit 102 is completed, the take-off point calculation process (S403) is started by the take-off point calculation unit 103.

In the take-off point calculation process (S403), the amount of change related to the three-dimensional position of the specific point is calculated from the information of a plurality of consecutive image frames and the take-off point at which the moving object as the target has taken off is determined from the thus-calculated amount of change, then the three-dimensional position of the specific point at the take-off point is calculated.

In this embodiment, in the take-off point calculation process (S403), the amount of change related to the three-dimensional position of the specific point is calculated from the information of a plurality of image frames that are consecutive in the chronological order of the captured time, and the take-off point is determined by assuming that the moving object as the target has taken off when the calculated amount of change exceeds the threshold value, then the three-dimensional position of the specific point at the take-off point is calculated.

The take-off point calculation process (S403) by the take-off point calculation unit 103 will be described with reference to FIG. 7. In the take-off point calculation process (S403), the position of the specific point is calculated assuming that the skater is not jumping.

Figure 7:
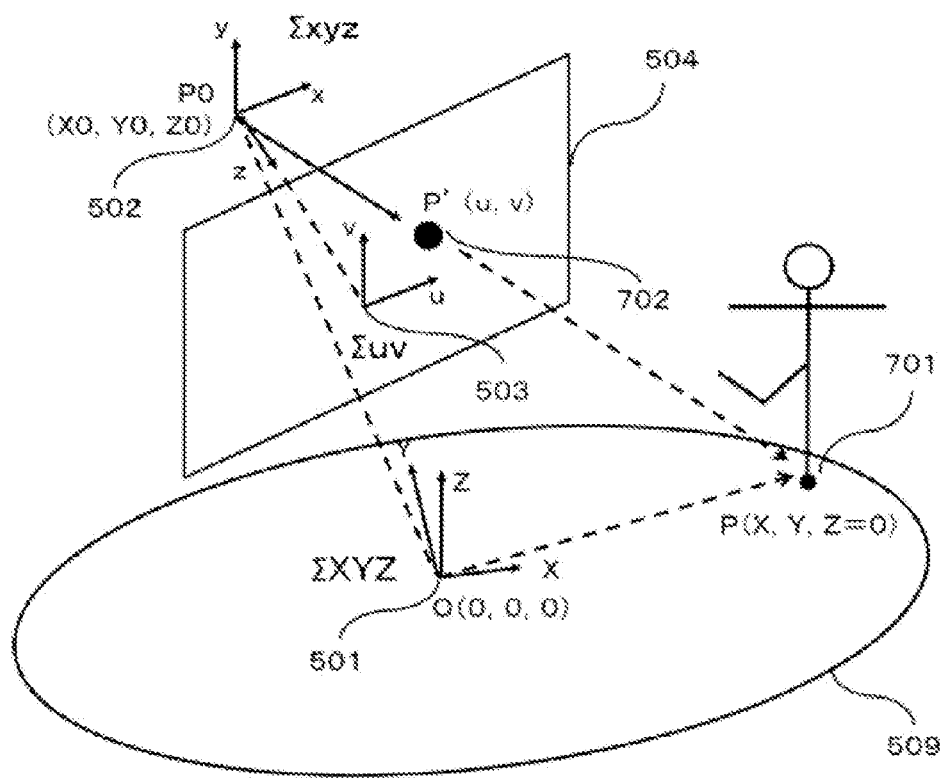
FIG. 7 shows a diagram for explaining a take-off point calculation process and a landing point calculation process.

In FIG. 7, the coordinates of the two-dimensional position in the two-dimensional Cartesian coordinate system Σuv of the image 702 of the point 701 at the tip of the blade of the skate boot worn by the skater in the image frame 504 are sent from the detection unit 101 to the existence straight line calculation unit 102 such that, as described above with reference to FIG. 6, the existence straight line connecting the image 702 of the specific point 701 and the optical center (origin 502) of the lens in FIG. 7 is obtained by the above-mentioned linear equation (Formula 1) in the existence straight line calculation process (S402).

Next, the position of the specific point is calculated in the take-off point calculation process (S403) assuming that the skater is not jumping. If the skater is not jumping, the specific point is located at the contact point 701 between the tip of the blade of the skate boot worn by the skater and the ice surface of the rink. The contact point 701 between the tip of the blade of the skate boot worn by the skater and the ice surface of the rink is located on the ice surface 509 of the rink. At this time, the specific point (the contact point 701 between the tip of the blade of the skate boot worn by the skater and the ice surface of the rink) exists on the existence straight line calculated in the existence straight line calculation process (S402) and exists on the ice surface 509 of the rink such that the coordinates of the three-dimensional position are calculated by letting the intersection of the thus-calculated existence straight line and the ice surface 509 be the specific point. Here, the value of the Z coordinate of the calculated specific point in the three-dimensional Cartesian coordinate system ΣXYZ is to be 0.

As described above, in the take-off point calculation process (S403), the position of the specific point is calculated assuming that the skater is not jumping, but the skater is actually jumping. When jumping, the tip of the blade of the skate boot worn by the skater does not actually touch the ice surface 509 of the rink such that, assuming that the intersection of the ice surface 509 of the rink and the straight line calculated in the existence straight line calculation process (S402) is set as the specific point, the values of the X element and the Y element of the three-dimensional coordinates of the specific point suddenly change at the moment when the skater takes off in the way as the specific point is departing from the optical center of the lens of the camera.

From this, the following process is taken, as an example, in the take-off point calculation process (S403). Predicted values of the X element and the Y element of the three-dimensional coordinates of the specific point having been obtained from the past five (5) image frames that are consecutive in the captured time when the values of the X element and the Y element of the three-dimensional coordinates of the contact points between the ice surface 509 of the rink and the tip of the blade of the skate boot worn by the skater as the specific point are calculated by the polynomial approximation. With respect to two specific points in the adjacent image frames in the chronological order of the captured time, the differences between the above-mentioned predicted values of X element and the Y element of the three-dimensional coordinates in the two image frames are obtained. The amount of movement of the specific point in the direction departing from the optical center of the lens of the camera may be calculated from the differences between the predicted values of the X element and the Y element of the three-dimensional coordinates in the two image frames, and the amount of movement may be made to be the amount of change. For example, in the case where the amount of change is 50 or more in the direction where the specific point is departing from the optical center of the lens of the camera, the change is defined as the threshold-exceeding change that exceeds the threshold value. In the take-off point calculation process (S403), the amount of change for the specific point in the chronological order of the captured time at which the image was taken, and when the calculated amount of change is larger than a predetermined threshold value, the take-off point is determined as the moving object as the target has taken off, such that the three-dimensional position of the specific point at the takeoff point is calculated and the thus-calculated three-dimensional position is sent to the next process. It should be noted that this is an example, and the take-off point calculation process (S403) and the method of taking the threshold value are not limited to this.

When the take-off point calculation process (S403) is completed, the landing point calculation process (S404) is started by the landing point calculation unit 104. In this embodiment, in the landing point calculation process (S404), the amount of change related to the three-dimensional position of the specific point is calculated from the information of a plurality of consecutive image frames, and the landing point where the moving object as the target lands is determined from the thus-calculated amount of change, such that the three-dimensional position of the specific point at the landing point is calculated.

In the landing point calculation process (S404), the same processing as the above-mentioned take-off point calculation process (S403) is performed for information of a plurality of image frames that are consecutive in the reverse chronological order of the captured time, and the three-dimensional position of the landing point is calculated at the landing point. The take-off point calculation process (S403) and the landing point calculation process (S404) differ in the time when a plurality of consecutive image frames are captured in the chronological order and the reverse chronological order, but they are common in the other processing such that an explanation thereof is omitted.

Further, the landing point calculation process (S404) may be performed by the process as described below. The process of the landing point calculation process (S404) may be facilitated or eased by utilizing the characteristics that the skater's jumping is the parabolic motion. The amount of change related to the three-dimensional position of the specific point is calculated from the information of a plurality of image frames that are consecutive in the chronological order of the captured time when the take-off point was captured and later. Here, the amount of change is, as mentioned above, the amount of movement of the specific point in the direction in which the specific point is departing from the optical center of the lens of the camera is calculated from the differences between the predicted values of the X element and the Y element of the three-dimensional coordinates in the two image frames, and the thus-calculated amount of movement is defined as the amount of change. Next, the image-captured time at the moment when the thus-calculated amount of change changes from positive to negative or from negative to positive is obtained. The thus-obtained image-captured time is defined as the time when the moving object as the target at the apex of the jumping was captured. The period of time from the time when the take-off point was captured to the time when the moving object at the apex was captured is obtained. Next, the period of time is doubled to obtain the doubled period of time. A constant period of time is added to the doubled period of time so as to obtain the thus-added period of time. Then, the time calculated by adding the thus-added period of time to the time when the landing point was captured (advancing the time) is obtained. The amount of change related to the three-dimensional coordinates of the position of the specific point is calculated from the information of a plurality of image frames that are consecutive in the retrograde order (reverse chronological order) from the thus-calculated time to the time when the landing point was captured. When the calculated amount of change is larger than a predetermined threshold value, the landing point is determined as the moving object as the target has landed such that the three-dimensional coordinates of the specific point are calculated at the landing point.

It will be explained concretely with reference to FIG. 3. As mentioned above, FIG. 3 shows the diagram schematically depicting the state in which the skater is jumping in a figure skating competition described as a preferred example in this embodiment. As schematically illustrated in FIG. 3, the skater's jumping has the characteristics of being a parabolic motion. In FIG. 3, each of 301 to 305 indicates the tip of the blade of the skate boot worn by the jumping skater and, in this embodiment, the tip of the blade of the skate boot is the specific point. The specific point at the take-off point is indicated by 301, the specific point at the landing point is indicated by 302, and the specific points in the air during the jumping are indicated by 303 to 305. In particular, the specific point at the apex in the trajectory of the jumping is indicated by 304. In the landing point calculation process (S404), it is utilized that the specific point 301 at the take-off point and the specific point 302 at the landing point are located substantially in symmetrical positions across the specific point 304 at the apex as the center based on the characteristics of the parabolic motion. Since it is estimated that the period of time for the skater's specific point to move from the take-off point 301 to the specific point 304 at the apex and the period of time for the skater's specific point to move from the specific point 304 at the apex to the specific point 302 at the landing point are almost the same, the time when the specific point 302 at the landing point was captured by the camera can be approximately obtained by adding the doubled period of time for the skater's specific point to move from the take-off point 301 to the specific point 304 at the apex to the time when the specific point 301 at the take-off point was captured by the camera. The landing point may be calculated from the information of a plurality of image frames that are consecutive in the retrograde order (reverse chronological order) as the first image frame starts from the time calculated by adding a constant period of time (e.g., 1 second and the like) as a buffer to the approximately-obtained time as mentioned above. In this way, the process may be alleviated since the search for the specific point at the landing point can be performed efficiently from the neighborhood of the specific point 302 at the landing point. Here, the specific point 304 at the apex is determined by detecting that the values of the X element and the Y element of the three-dimensional coordinates of the specific point change from the variation in the direction departing from the optical center of the lens of the camera to the variation in the direction approaching the optical center of the lens of the camera. Here, it should be noted that this is an example, and the landing point calculation process (S404) and the method of taking the threshold value are not limited to this.

When the landing point calculation process (S404) is completed, the trajectory calculation process (S405) is started by the trajectory calculation unit 105. Through the trajectory calculation process (S405), the trajectory of the specific point in the three-dimensions is calculated from the positional relation of the existence straight line related to the image of the specific point captured in one or more image frames after take-off of the moving object as the target, but before landing of the moving object as the target, and the curved line that can express the parabolic motion passing through the three-dimensional position of the specific point at the take-off point calculated through the take-off point calculation process (S403) and the three-dimensional position of the specific point at the landing point calculated through the landing point calculation process (S404).

Figure 8:
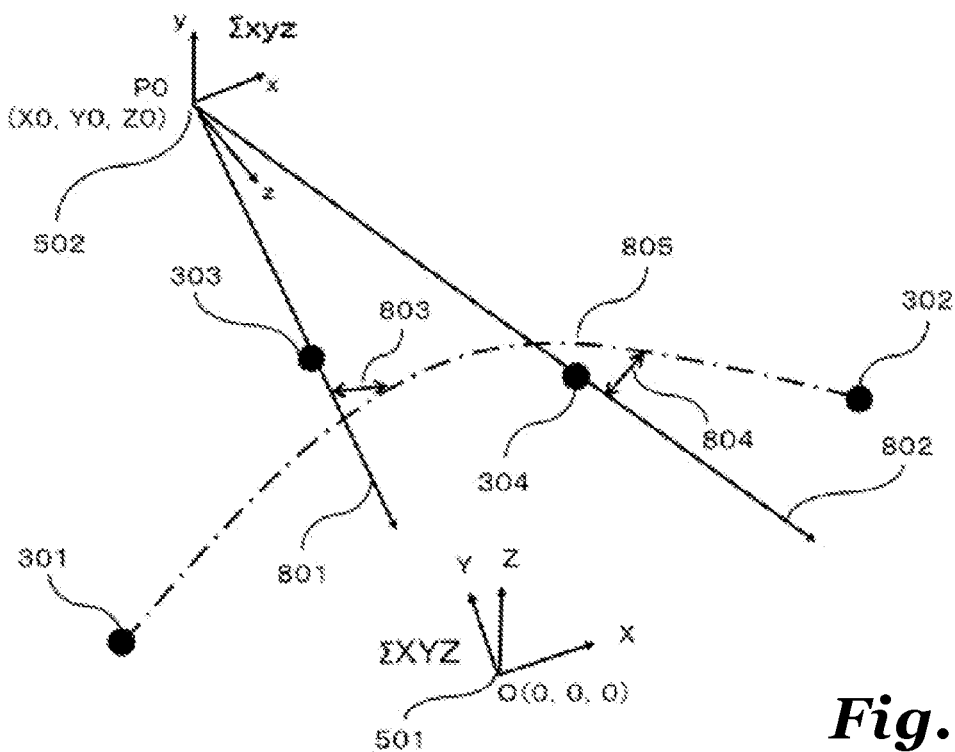
FIG. 8 shows a diagram illustrating an example of a trajectory calculation process.

FIG. 8 shows a diagram illustrating an example of the trajectory calculation process (S405). An example of the trajectory calculation process (S405) will be explained with reference to FIG. 8. In this example, through the trajectory calculation process (S405), the curved line is calculated as the trajectory of the specific point in the three-dimensions, wherein the curved line can express the parabolic motion passing through the three-dimensional position of the specific point at the take-off point calculated through the take-off point calculation process (S403) and the three-dimensional position of the specific point at the landing point calculated through the landing point calculation process (S404) and wherein the curved line is calculated so as to minimize the total distance from the existence straight line or lines with respect to the one or more images of the specific point captured in one or more image frames after the take-off of the moving object as the target, but before the landing of the moving object as the target.

In FIG. 8, four (4) specific points are set as a take-off point 301, a landing point 302, and specific points 303 and 304 in the air in consideration of ease of explanation and understanding. The same explanation will apply even if the number of specific points in the air increases. The existence straight line for the specific point 303 is indicated by 801 and the existence straight line for the specific point 304 is indicated by 802. And, the curved line 805 depicted by the dash-dot-dash line is a curved line that can express the parabolic motion passing through the specific point 301 at the take-off point and the specific point 302 at the landing point.

The curved line 805 can be represented by, for example, three formulae as shown in the following equations (Formulae 2). The equations (Formulae 2) are expressed here in the three-dimensional Cartesian coordinate system $\Sigma XYZ$. The following notation arrangement applies only to the explanation of the equations (Formulae 2). Here, t is the time, m is the mass, g is the gravitational acceleration, v is the velocity, and k is the viscosity coefficient. Further, the subscripts x, y, and z indicate the X element, the Y element, and the Z element in the three-dimensional Cartesian coordinate system $\Sigma XYZ$, respectively.

Each of the equations representing the X element, the Y element, and the Z element in the three-dimensional Cartesian coordinate system $\Sigma XYZ$ represented by the respective equations (Formulae 2) has three parameters. In the first equation representing the X element, there are three of $x_0$, $v_{x0}$ and $k_x/m$, in the second equation representing the Y element, there are three of $y_0$, $b_{y0}$ and $k_y/m$, and in the third equation representing the Z element, there are three of $z_0$, $v_{z0}$, $k_z/m$. By substituting the coordinate values of the take-off point 301 and the take-off time, and the coordinate values of the landing point 302 and the landing time into the equations (Formulae 2), up to two of the three parameters of each equation can be determined.

$$x(t) = \frac{m}{k_x}v_{x0}(1 - e^{-\frac{k_x}{m}t}) + x_0$$

$$y(t) = \frac{m}{k_y}v_{y0}(1 - e^{-\frac{k_y}{m}t}) + y_0$$

$$z(t) = \frac{m}{k_z}\left(v_{z0} + \frac{m}{k_z}g\right)\left(1 - e^{-\frac{k_z}{m}t}\right) - \frac{m}{k_z}gt + z_0$$

(Formulae 2)

Through the trajectory calculation process (S405), it is determined that the curved line is the trajectory of the specific point in the three-dimensions, wherein the curved line is calculated by calculating the value of the rest one parameter for each equation in the above-mentioned equations (Formulae 2) such that the sum of the distance 803 between the curved line 805 and the existence straight line 801 and the distance 804 between the curved line 805 and the existence straight line 802 is minimized as shown in FIG. 8.

Figure 9:
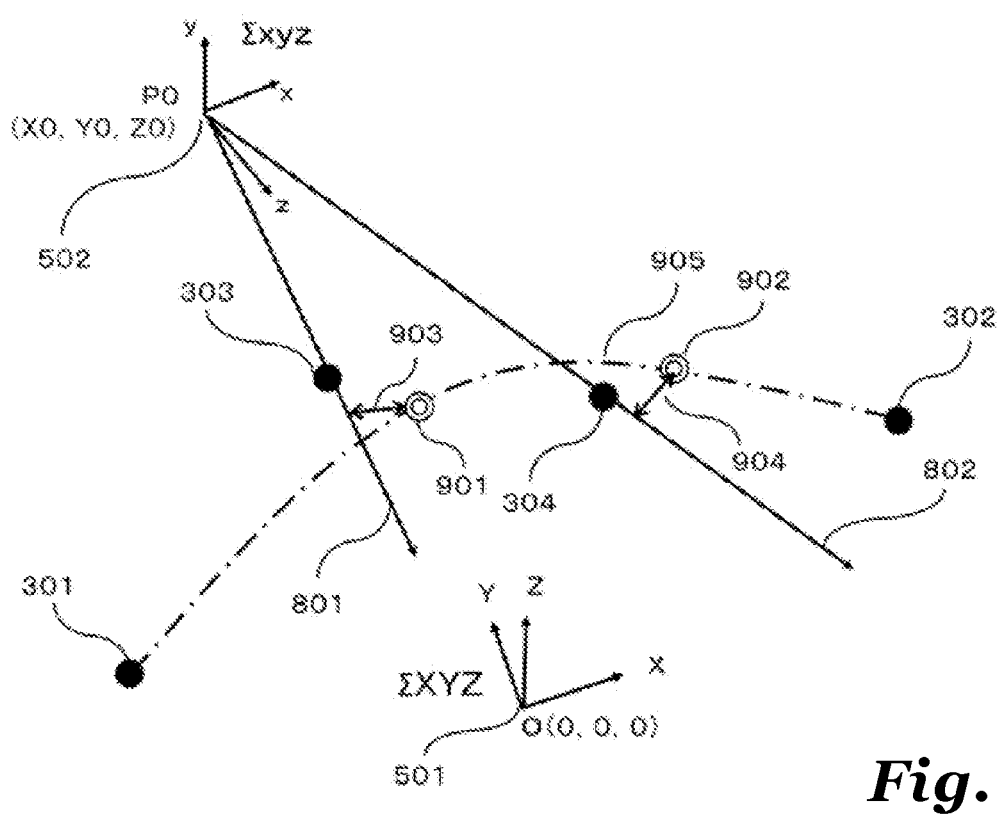
FIG. 9 shows a diagram illustrating another example of a trajectory calculation process.

Further, FIG. 9 shows a diagram illustrating another example of the trajectory calculation process (S405). The other example of the trajectory calculation process (S405) will be explained with reference to FIG. 9. In this example, through the trajectory calculation process (S405), a curved line is calculated as the trajectory of the specific point in three dimensions, wherein the curved line can express the parabolic motion passing through the three-dimensional position of the specific point at the take-off point calculated through the take-off point calculation process (S403) and the three-dimensional position of the specific point at the landing point calculated through the landing point calculation process (S404) and wherein the respective distances between one or more existence straight lines for the images of the specific point captured in the image frames at respective times when one or more images of the specific point being captured after the take-off of the moving object as the target and before the landing of the moving object as the target and one or more predicted positions on the curved line at respective times when the specific point being calculated are calculated and wherein the curved line minimizes the sum of the calculated distances between one or more existence straight lines and one or more predicted positions, respectively.

In FIG. 9, four (4) specific points are set as a take-off point 301, a landing point 302, and specific points 303 and 304 in the air in consideration of ease of explanation and understanding. The same explanation will apply even if the number of specific points in the air increases. The existence straight line for the specific point 303 is indicated by 801 and the existence straight line for the specific point 304 is indicated by 802. And, the curved line 905 depicted in the dash-dot-dash line is a curved line that can express the parabolic motion passing through the specific point 301 at the take-off point and the specific point 302 at the landing point. The curved line 905 can be represented by, for example, the above-mentioned equations (Formulae 2) in the same manner as the curved line 805 in FIG. 8.

Through the trajectory calculation process (S405), the predicted position 901 of the specific point on the curved line 905 at the time when the specific point 303 in the air was captured by the camera is calculated by the above-mentioned equations (Formulae 2). Similarly, the predicted position 902 of the specific point on the curved line 905 at the time the specific point 304 in the air was captured by the camera is calculated by the above-mentioned equations (Formulae 2).

Through the trajectory calculation process (S405), the rest one parameter for each of the above-mentioned equations (Formulae 2) is calculated so as to minimize the sum of the distance 903 between the predicted position 901 of the specific point on the curved line 905 and the existence straight line 801 and the distance 904 between the predicted position 902 of the specific point on the curved line 905 and the existence straight line 802 and the thus-calculated curved line is determined to be the trajectory of the specific point in the three dimensions.

The above is the explanation of examples.

Next, a trajectory calculation program for making the computer serve as an trajectory calculation device will be explained. The configuration of the computer is as illustrated in FIG. 2.

The trajectory calculation program includes a main module, an input-output module, and a processing module. The main module is the part that controls the process in an integrated manner. The input-output module causes the computer to acquire input information such as image data and to output the calculated trajectory information in the form of numerical values and images. The processing module includes a detection module, an existence straight line calculation module, a take-off point calculation module, a landing point calculation module, and a trajectory calculation module. The functions realized by executing the main module, the input module, and the processing module are the same as functions of the detection unit 101, the existence straight line calculation unit 102, the take-off point calculation unit 103, the landing point calculation unit 104, and the trajectory calculation unit 105 of the trajectory calculation device 1, respectively.

The trajectory calculation program is provided, for example, by a storage medium such as ROM or a semiconductor memory. And the trajectory calculation program may be provided via the network.

As described above, according to the trajectory calculation device, the trajectory calculation method, and the trajectory calculation program according to the present embodiment, the trajectory of the moving object can be calculated with high accuracy from the moving image captured by the monocular camera in the athletic competition involving jumping such as figure skating.

Although the invention is described in terms of specific illustrative embodiments and methods above, it is to be understood that the embodiments and methods described herein are by way of example only and that the scope of the invention is not intended to be limited thereby.

What is claimed is:

1. A trajectory calculation device capable of calculating a trajectory of a moving object as a target jumping in three dimensions from information of a plurality of image frames captured by a monocular camera, comprising:
    a detection unit that detects a specific point of the moving object from the plurality of image frames;
    an existence straight line calculation unit that calculates an existence straight line connecting a three-dimensional position with respect to an image of the specific point captured in each of the image frames and a three-dimensional position of an optical center of a lens of the monocular camera;
    a take-off point calculation unit that calculates a three-dimensional position of the specific point at a take-off point by calculating an amount of change related to a three-dimensional position of the specific point from information of the plurality of image frames that are consecutive and determining the take-off point where the moving object as the target takes off from the calculated amount of change;
    a landing point calculation unit that calculates a three-dimensional position of the specific point at a landing point by calculating an amount of change related to a three-dimensional position of the specific point from information of the plurality of image frames that are consecutive and determining the landing point where the moving object lands from the calculated amount of change; and
    a trajectory calculation unit that calculates the trajectory of the specific point in three dimensions from a positional relation of a curved line and the existence straight line wherein the curved line is capable of expressing a parabolic motion passing through the three-dimensional position of the specific point at the take-off point and the three-dimensional position of the specific point at the landing point and wherein the existence straight line connects the three-dimensional position of the optical center and the three-dimensional position with respect to the image of the specific point captured in each of the plurality of image frames after take-off and before landing of the moving object.

2. The trajectory calculation device according to claim 1, wherein the take-off point calculation unit comprises:
    means for calculating a three-dimensional position of the specific point at the take-off point by
        calculating an amount of change related to a three-dimensional position of the specific point from information of the plurality of image frames that are consecutive in a chronological order of captured times and determining the take-off point as the moving object takes off when the calculated amount of change is larger than a predetermined threshold value.

3. The trajectory calculation device according to claim 2, wherein the landing point calculation unit comprises:
means for calculating a three-dimensional position of the specific point at the landing point by
calculating an amount of change related to a three-dimensional position of the specific point from information of the plurality of image frames that are consecutive in a reverse chronological order of captured times and
determining the landing point as the moving object lands when the calculated amount of change is larger than a predetermined threshold value.

4. The trajectory calculation device according to claim 3, wherein the trajectory calculation unit comprises:
means for calculating the curved line as a trajectory of the specific point in three dimensions, wherein
the curved line is capable of expressing a parabolic motion passing through a three-dimensional position of the specific point at the take-off point and a three-dimensional position of the specific position at the landing point and
the curved line is calculated so as to minimize a sum of distances between the curved line and the existence straight line with respect to each of images of the specific point captured in the plurality of image frames after take-off of the moving object and before landing of the moving object.

5. The trajectory calculation device according to claim 3, wherein the trajectory calculation unit comprises:
means for calculating the curved line as a trajectory of the specific point in three dimensions, wherein
the curved line is capable of expressing a parabolic motion passing through a three-dimensional position of the specific point at the take-off point and a three-dimensional position of the specific position at the landing point and
the curved line is calculated so as to minimize a sum of distances between a predicted position on the curved line at a time when capturing the specific point and the existence straight line with respect to an image of the specific point captured at the same time in one of the plurality of image frames, which are captured at times after take-off and before landing of the moving object.

6. The trajectory calculation device according to claim 2, wherein the landing point calculation unit comprises:
means for calculating a three-dimensional position of the specific point by
calculating an amount of change related to a three-dimensional position of the specific point from information of the plurality of image frames that are consecutive in a chronological order of captured times after capturing the landing point;
acquiring time of capturing the moving object at an apex of jumping by determining the moving object reaches the apex of the jumping when the calculated amount turns from positive to negative or from negative to positive;
calculating an amount of change related to a three-dimensional position of the specific point from information of the plurality of image frames that are consecutive in a reverse chronological order of captured times starting from time when a period of time obtained by doubling a period of time from when capturing the take-off point to when capturing the moving object at the apex and by further adding a constant period of time thereto passes by from when capturing the take-off point; and
determining the landing point as the moving object lands when the calculated amount of change is larger than a predetermined threshold value.

7. The trajectory calculation device according to claim 6, wherein the trajectory calculation unit comprises:
means for calculating the curved line as a trajectory of the specific point in three dimensions, wherein
the curved line is capable of expressing a parabolic motion passing through a three-dimensional position of the specific point at the take-off point and a three-dimensional position of the specific position at the landing point and
the curved line is calculated so as to minimize a sum of distances between the curved line and the existence straight line with respect to each of images of the specific point captured in the plurality of image frames after take-off of the moving object and before landing of the moving object.

8. The trajectory calculation device according to claim 6, wherein the trajectory calculation unit comprises:
means for calculating the curved line as a trajectory of the specific point in three dimensions, wherein
the curved line is capable of expressing a parabolic motion passing through a three-dimensional position of the specific point at the take-off point and a three-dimensional position of the specific position at the landing point and
the curved line is calculated so as to minimize a sum of distances between a predicted position on the curved line at a time when capturing the specific point and the existence straight line with respect to an image of the specific point captured at the same time in one of the plurality of image frames, which are captured at times after take-off and before landing of the moving object.

9. The trajectory calculation device according to claim 2, wherein the trajectory calculation unit comprises:
means for calculating the curved line as a trajectory of the specific point in three dimensions, wherein
the curved line is capable of expressing a parabolic motion passing through a three-dimensional position of the specific point at the take-off point and a three-dimensional position of the specific position at the landing point, and
the curved line is calculated so as to minimize a sum of distances between the curved line and the existence straight line with respect to each of images of the specific point captured in the plurality of image frames after take-off and before landing of the moving object.

10. The trajectory calculation device according to claim 2, wherein the trajectory calculation unit comprises:
means for calculating the curved line as a trajectory of the specific point in three dimensions, wherein
the curved line is capable of expressing a parabolic motion passing through a three-dimensional position of the specific point at the take-off point and a three-dimensional position of the specific position at the landing point and
the curved line is calculated so as to minimize a sum of distances between a predicted position on the curved line at a time when capturing the specific point and the existence straight line with respect to an image of the specific point captured at the same time in one of the plurality of image frames, which are captured at times after take-off and before landing of the moving object.

11. The trajectory calculation device according to claim 1, wherein the trajectory calculation unit comprises:
means for calculating the curved line as a trajectory of the specific point in three dimensions, wherein
the curved line is capable of expressing a parabolic motion passing through a three-dimensional position of the specific point at the take-off point and a three-dimensional position of the specific point at the landing point and
the curved line is calculated so as to minimize a sum of distances between the curved line and the existence straight line with respect to each of images of the specific point captured in the plurality of image frames after take-off and before landing of the moving object.

12. The trajectory calculation device according to claim 1, wherein the trajectory calculation unit comprises:
means for calculating the curved line as a trajectory of the specific point in three dimensions, wherein
the curved line is capable of expressing a parabolic motion passing through a three-dimensional position of the specific point at the take-off point and a three-dimensional position of the specific position at the landing point and
the curved line is calculated so as to minimize a sum of distances between a predicted position on the curved line at a time when capturing the specific point and the existence straight line with respect to an image of the specific point captured at the same time in one of the plurality of image frames, which are captured at times after take-off and before landing of the moving object.

13. A trajectory calculation method of calculating a trajectory of a moving object as a target jumping in three dimensions from information of a plurality of image frames captured by a monocular camera, comprising the steps of:
detecting a specific point of the moving object from the plurality of image frames;
calculating an existence straight line connecting a three-dimensional position with respect to an image of the specific point captured in each of the image frames and a three-dimensional position of an optical center of a lens of the monocular camera;
calculating a three-dimensional position of the specific point at a take-off point by calculating an amount of change related to a three-dimensional position of the specific point from information of the plurality of image frames that are consecutive and determining the take-off point where the moving object takes off from the calculated amount of change;
calculating a three-dimensional position of the specific point at a landing point by calculating an amount of change related to a three-dimensional position of the specific point from information of the plurality of image frames that are consecutive and determining the landing point where the moving object lands from the calculated amount of change; and
calculating the trajectory of the specific point in three dimensions from a positional relation of a curved line and the existence straight line wherein the curved line is capable of expressing a parabolic motion passing through the three-dimensional position of the specific point at the take-off point and the three-dimensional position of the specific point at the landing point and wherein the existence straight line connects the three-dimensional position of the optical center and the three-dimensional position with respect to the image of the specific point captured in each of the plurality of image frames after take-off and before landing of the moving object.

14. A trajectory calculation device capable of calculating a trajectory of a moving object as a target jumping in three dimensions from information of a plurality of image frames captured by a monocular camera, comprising:
an input device capable of inputting the information of the plurality of image frames;
an output device capable of outputting the trajectory;
a memory capable of storing the information of the plurality of image frames; and
a central processing unit capable of controlling the trajectory calculation device, wherein the central processing unit is operable to:
detect a specific point of the moving object from the image frames;
calculate an existence straight line connecting a three-dimensional position of the specific point captured in each of the image frames and a three-dimensional position of an optical center of a lens of the monocular camera;
calculate an amount of change related to three-dimensional positions of images of the specific point from information of the consecutive image frames;
determine a take-off point where the moving object takes off based on the calculated amount of change;
calculate a three-dimensional position of the specific point at the take-off point;
calculate an amount of change related to three-dimensional positions of images of the specific point from information of the consecutive image frames;
determine a landing point where the moving object lands based on the calculated amount of change;
calculate a three-dimensional position of the specific point at the landing point; and
calculate the trajectory of the specific point in three dimensions from a positional relation of a curved line and the existence straight line wherein the curved line is capable of expressing a parabolic motion passing through the three-dimensional position of the take-off point and the three-dimensional position of the landing point and wherein the existence straight line connects the three-dimensional position of the optical center and the three-dimensional position with respect to the image of the specific point captured in each of the plurality of image frames after take-off and before landing of the moving object.

15. The trajectory calculation device according to claim 14, wherein the curved line is calculated so as to minimize a sum of distances between the curved line and the existence straight line with respect to the specific point captured in each of the image frames.

16. The trajectory calculation device according to claim 14, wherein the curved line is calculated so as to minimize a sum of distances between a predicted position on the curved line at a time when capturing the specific point and the existence straight line with respect to the specific point captured at the same time in one of the plurality of image frames, which are captured at times after take-off and before landing of the moving object.

17. The trajectory calculation device according to claim 14, wherein the curved line is represented by $x(t)=m/k_x v_{x0}(1-e-k_{x^t}/m)+x_0$ $y(t)=m/k_y v_{y0}(1-e-k_{y^t}/m)+y_0$ $z(t)=m/k_z(v_{z0}+m/k_z g)(1-e-k_{z^t}/m)-m/k_z gt+z_0$ wherein t is time, m is mass, g is gravitational acceleration, v is velocity, and k is viscosity coefficient.

* * * * *